Patented Nov. 2, 1948

2,452,944

UNITED STATES PATENT OFFICE 2,452,944

FLUORINATED ETHERS

Earl T. McBee, West Lafayette, Ind., and William E. Weesner, Richmond Heights, Mo., assignors to Purdue Research Foundation, West Lafayette, Ind., a corporation of Indiana No Drawing. Application November 28, 1944, Serial No. 565,566

4 Claims. (Cl. 260—614)

This invention relates to 2,2,2-trifluorethylethyl ether and to fluoroalkyl-alkyl ethers containing the trifluoromethyl group ($CF_3$), and to a method of preparing them.

We have prepared representative members of the aforementioned group of compounds and determined certain of their physical properties whereby they may be identified. The substances are relatively stable water-white liquids at room temperature and atmospheric pressure which vaporize at moderately elevated temperatures and are useful as solvents and refrigerants.

Our general method for their preparation includes reacting alcohols containing a trifluoromethyl group with an alkyl halide in the presence of an alkali metal. Preferably, we first react an aliphatic alcohol containing from one to six carbon atoms, inclusive, and a trifluoromethyl group with finely-divided metallic sodium or potassium to produce an alkali metal trifluoromethyl alcoholate. This can be done at atmospheric pressure and temperatures slightly above normal room temperature, say 50 degrees centigrade. The alcoholate is then reacted with an alkyl halide, such as the chloride or bromide, containing from one to six carbon atoms inclusive. This step can be carried out under the vapor pressure of the reactants at temperatures employed. The temperature may range between about 125 degrees and about 150 degrees centigrade and the time required to obtain good yields of the ether may range up to 125 hours, although about 90 hours is usually sufficient. The reactants may be dispersed in a liquid medium, such as dry dioxane, during the condensation step.

The following example illustrates the specific practice of our invention, but is not to be construed as limiting the same:

In the preparation of 2,2,2-trifluoroethyl-ethyl ether, we first make "bird shot" sodium by shaking metallic sodium in boiling xylene. The xylene is then removed and dry dioxane added to cover the sodium. Through a water-cooled condenser, the desired amount of 2,2,2,-trifluoroethyl alcohol is then slowly added to the suspension of sodium. The reaction mixture is then warmed to cause the formation of a sodium fluoroalcoholate. The reaction mixture is then poured into a nickel bomb provided with a pressure gauge and needle valve. The bomb is then cooled in ice and an alkyl halide introduced. The bomb is then heated to and maintained at a temperature of approximately 125 degrees to 150 degrees centigrade for periods of time ranging from 75 to 125 hours. The bomb is then cooled, the reaction product washed into a distilling flask with excess dioxane, and rectified on a Podbielniak-type fractionating column.

By the procedure above described, we prepared 4.55 grams of bird shot sodium in 200 milliliters of dioxane and mixed this with 20 grams of trifluoroethyl alcohol ($CF_3CH_2OH$). The sodium fluoroalcoholate in its dioxane medium was then placed in a 400 milliliter bomb and 20.8 grams of ethyl bromide run into the bomb. The bomb was sealed, heated to and maintained at 130 degrees–135 degrees centigrade for 89 hours, cooled to room temperature, and the reaction product fractionally distilled to recover 10 grams of 2,2,2-trifluoroethyl-ethyl ether ($CH_3CH_2OC_2H_5$). The boiling point of this compound is 50.3 degrees centigrade, its refractive index at 25 degrees centigrade is 1.3065, and its density at 25 degrees/25 degrees is 1.065.

Our general method of reacting an alkali metal trifluoroalkyl alcoholate with an alkyl halide, wherein each of the alkyl groups contains from one to five carbon atoms is particularly applicable in the preparation of compounds represented by the formula $CF_3(CH_2)_nOC_2H_5$, wherein "N" is a digit from one to five, inclusive. Other representative compounds of this group are represented by the following formulae:

$CF_3CH_2CH_2OC_2H_5$ and $CF_3CH_2CH_2CH_2CH_2OC_2H_5$

Our process is also applicable to the preparation of the fluorinated ethers having the formulae $CF_3CH_2CH_2OC_3H_7$, $CF_3CH_2CH_2OC_6H_{13}$, and $CF_3CH_2CH_2OC_4H_9$, which are within the scope of our group of novel ethers.

We claim:

1. The compound represented by the formula $CF_3CH_2OC_2H_5$.

2. The compounds represented by the formula $CF_3(CH_2)_nOC_2H_5$, in which $n$ is a digit from 1 to 5, inclusive.

3. A fluorinated ether represented by the general formula $CF_3(CH_2)_nO(CH_2)_nCH_3$, in which $n$ is a positive integer from one to five, inclusive.

4. The method for the preparation of fluorinated ethers which includes: reacting an alkali metal trifluoroalkyl alcoholate, containing a trifluoromethyl group and from one to six carbon atoms, inclusive, with an alkyl halide, containing from one to six carbon atoms, inclusive, under the vapor pressure of the reaction mixture at a temperature in the range between about 125 degrees and 150 degrees centigrade.

EARL T. McBEE.
WILLIAM E. WEESNER.

REFERENCES CITED

The following references are of record in the file of this patent:

UNITED STATES PATENTS

| Number | Name | Date |
|---|---|---|
| 2,066,905 | Booth | Jan. 5, 1937 |
| 2,336,921 | Benning | Dec. 14, 1943 |

FOREIGN PATENTS

| Number | Country | Date |
|---|---|---|
| 523,449 | Great Britain | July 15, 1940 |

OTHER REFERENCES

Swarts, "Chemisches Zentralblatt," 1901, II, page 804.

Swarts, "Chemisches Zentralblatt," 1899, II, page 281.

Burchfield, "Journal Am. Chem. Soc.," vol. 57, page 2070 (1935).